June 27, 1939.  W. HOWEY ET AL  2,164,209
REMOTE CONTROL PHOTOELECTRIC ENGRAVING
Filed July 25, 1935   6 Sheets-Sheet 1

Inventors.
WALTER HOWEY.
BENJAMIN WOODWARD.
JOHN R. HANCOCK.
BY
N. S. Amstutz
ATTORNEY.

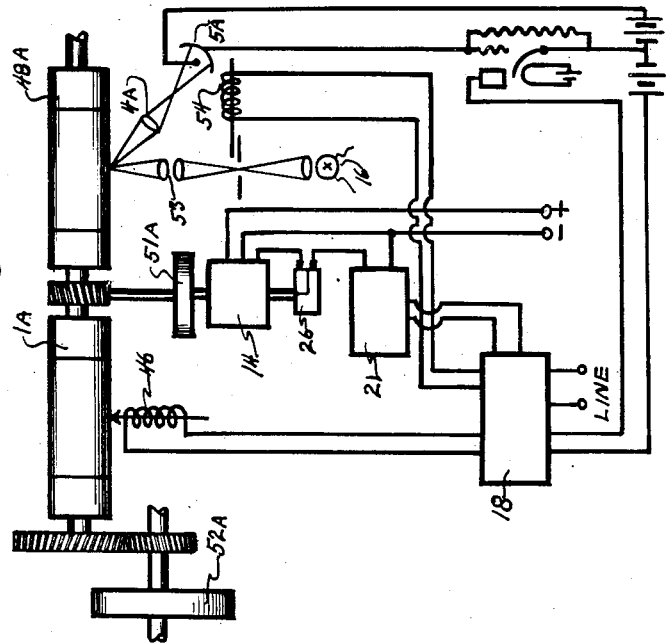
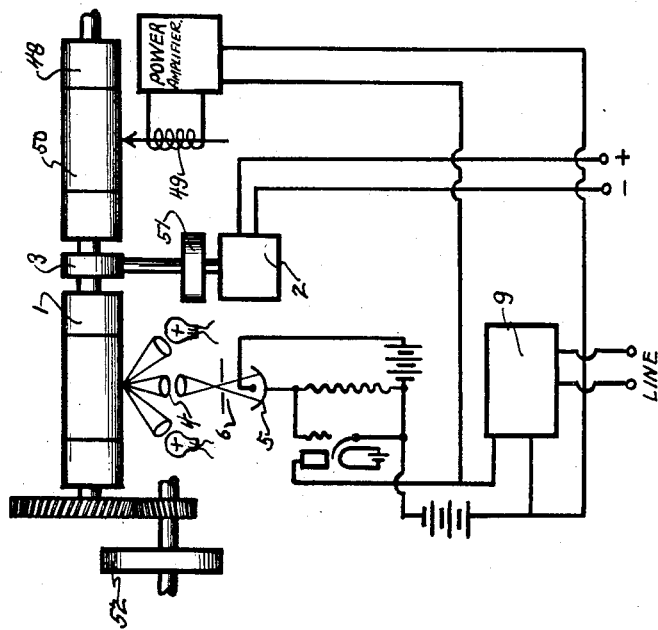

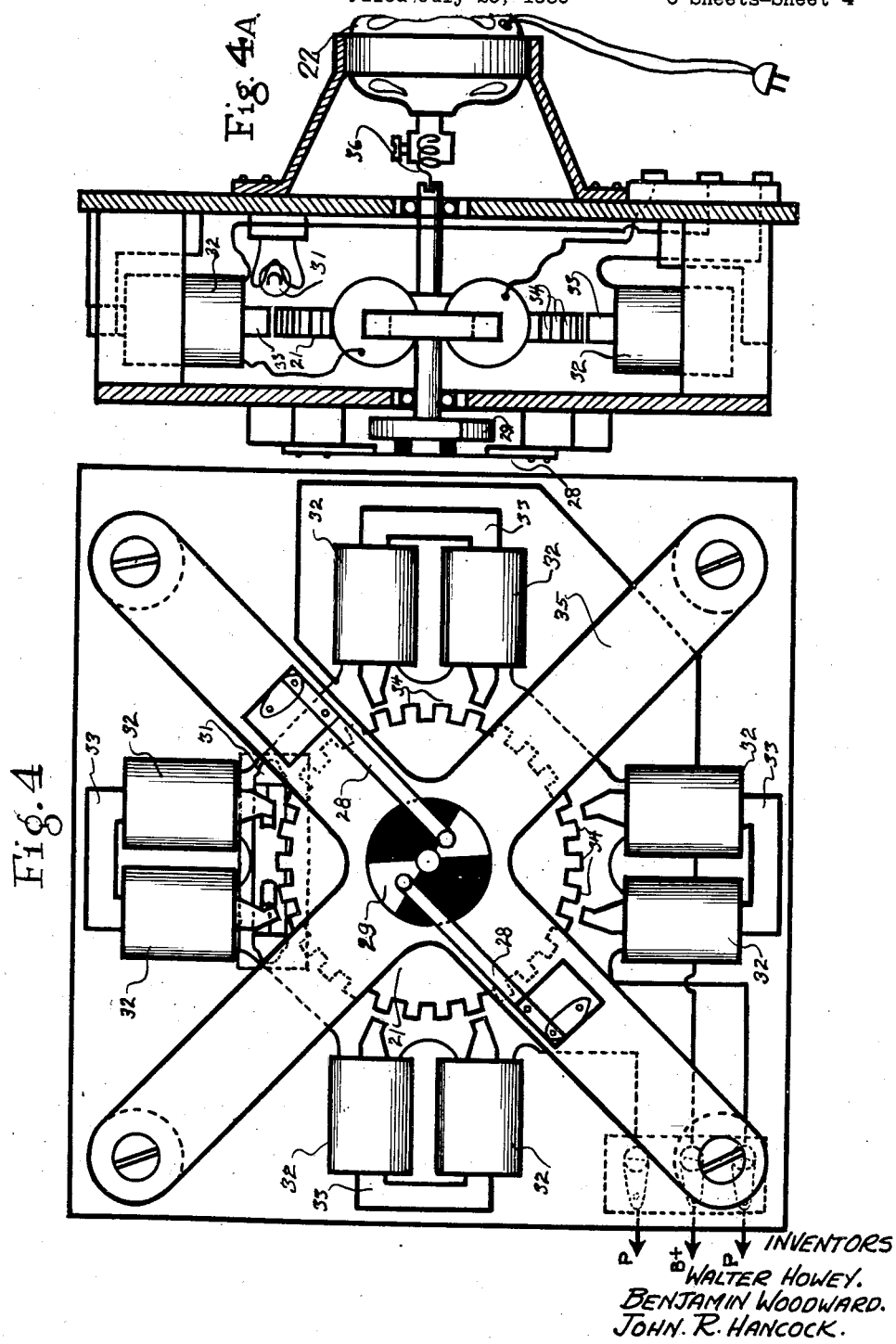

June 27, 1939.   W. HOWEY ET AL   2,164,209
REMOTE CONTROL PHOTOELECTRIC ENGRAVING
Filed July 25, 1935   6 Sheets-Sheet 5
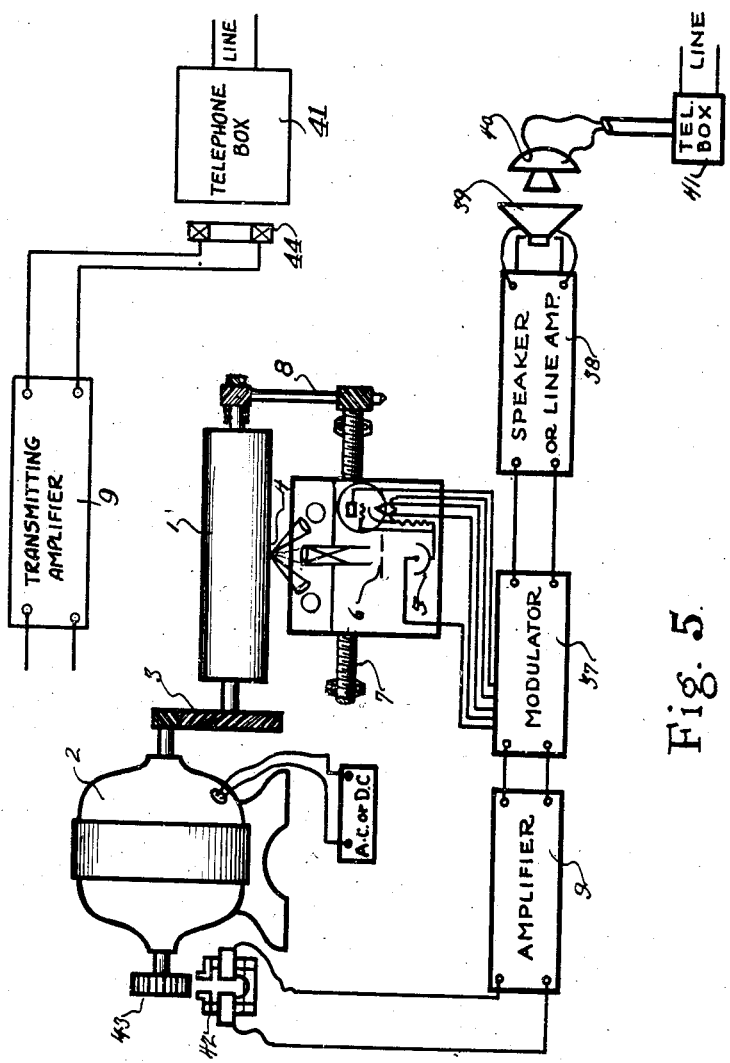
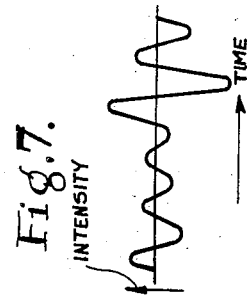
Inventors.
WALTER HOWEY.
BENJAMIN WOODWARD.
JOHN R. HANCOCK.
BY
ATTORNEY.

June 27, 1939.　　W. HOWEY ET AL　　2,164,209
REMOTE CONTROL PHOTOELECTRIC ENGRAVING
Filed July 25, 1935　　6 Sheets-Sheet 6
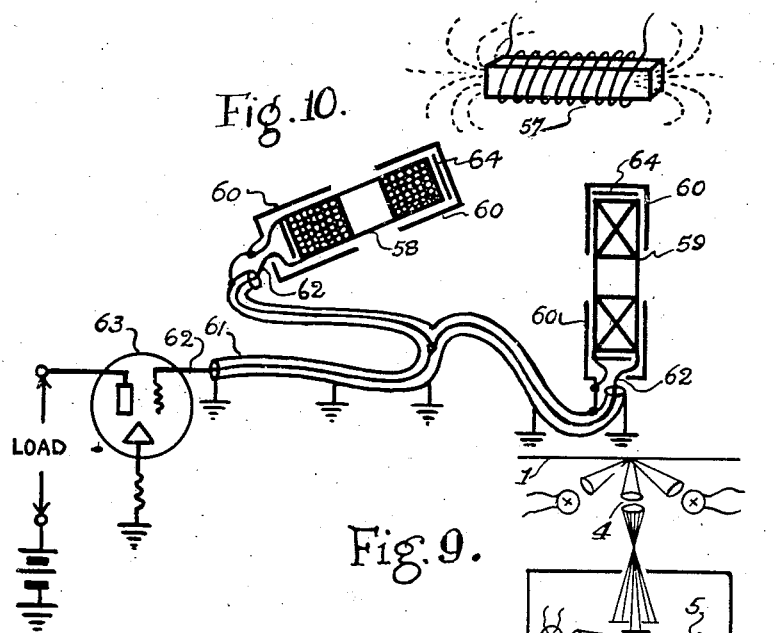
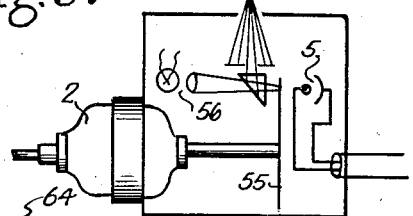
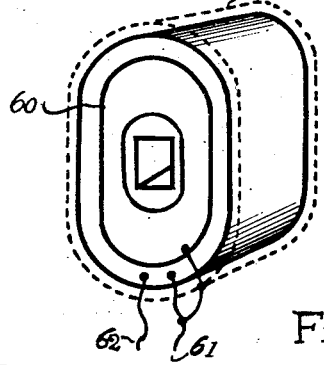
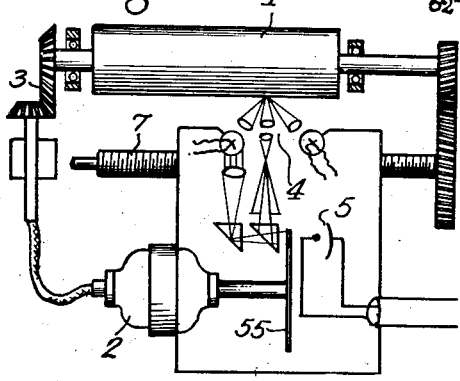
Inventors.
WALTER HOWEY.
BENJAMIN WOODWARD.
JOHN R. HANCOCK.
BY
N. S. Amstutz
ATTORNEY.

Patented June 27, 1939

2,164,209

UNITED STATES PATENT OFFICE 2,164,209

REMOTE CONTROL PHOTOELECTRIC ENGRAVING

Walter Howey, Benjamin Woodward, and John R. Hancock, New York, N. Y., assignors, by direct and mesne assignments, to Lee Electric Corporation, Demarest, N. J., a corporation of New Jersey Application July 25, 1935, Serial No. 33,038

10 Claims. (Cl. 178—5.6)

This invention provides for remote control of photoelectric engraving and recording by any channel transmitting a minimum level of carrier signal. It contributes to the art a novel and almost foolproof process of mono or polychromatic photoelectric engraving and picture transmission from remote points without recourse to high fidelity telephone lines.

This invention is directed to the use of a picture signal and carrier suitable for transmission over a telephone system of low fidelity such as rural telephone lines. Lines of this type automatically cut off audio frequencies above 2500 cycles. An 1800 cycle carrier illustrates how the frequency is within the limits of the system. Rural telephone systems may feed carrier currents to trunk lines having as many as 15 separate voice channels operated by carrier currents running as high as 150,000 cycles. In this invention the picture signal can be transmitted by any rural branch to carrier current trunks and also from such carrier current trunks to any rural terminal without distortion of the transmitted picture and without upsetting the telephone network.

This invention is an improvement in Letters Patent granted to Walter Howey, U. S. No. 1,719,621, issued July 2, 1929; U. S. No. 1,815,105, issued July 21, 1931; U. S. No. 1,849,544, issued March 15, 1932; U. S. No. 1,913,208, issued August 22, 1933; U. S. No. 1,914,258, issued June 13, 1934.

It may dispense with (1) physical or metallic connection to the transmitting network, (2) electrical interference of the transmitting network by the picture signal, (3) constant frequency carrier propagation for synchronization, (4) stopping or spoiling picture transmission by intermittent interruptions such as an operator's coming into or going off the line, (5) tuning forks, oscillators or clocks or any other local constant frequency generation for synchronization, (6) constant temperature controls, (7) synchronous motors, (8) rectification of carrier signal for transmitting or recording photographs and (9) the following procedure customary to picture transmission and reproduction by printing: (a) developed negative, (b) printed and developed positive, (c) processed negative, (e) sensitized resist on metal plate, (f) printed and developed metal plate, (g) engraving metal block.

This process generates photoelectric current for synchronizing the transmitting and the receiving drums, even when black portions of the picture, denoting absence of light, are being scanned and such frequency may swing within wide limits without upsetting synchronism. It modulates this current with variable amplitude for photoelectric engraving halftones and transmitting continuous tone pictures as disclosed in U. S. Patent No. 1,849,544 issued to Water Howey, March 15, 1932.

The variable amplitudes determine the tone value of the received picture. In U. S. Patent No. 1,849,544, the variable amplitudes were illustrated as being transmitted by the unidirectional current aperiodic amplifier. In the present remote control improvement the variable amplitudes are made to modulate the synchronizing carrier signal. One novel feature of this invention is elimination of rectification distortion. The invention provides for a positive control for the transmitting drum rotation, the line advance, carrier frequency, receiving drum rotation, receiver line advance and the duration in amplitude of the recording unit all dependent on a single initiating master which is the transmitting motor. Variations within wide limits of the speed of the transmitting motor compel corresponding compensations in each related factor of the entire system.

In order to make our invention clear to those skilled in the art, we show the following drawings:

Fig. 2 shows an improved form of our invention, showing automatic lag compensation for synchronizing.

Fig. 4 illustrates an enlarged view of a synchronous clock motor of the impulse type.

Fig. 5 shows one method of introducing a modulated picture signal into a telephone line.

Fig. 6 illustrates another method of introducing a picture signal into a line.

Fig. 7 is a graph showing how the carrier current is modulated in amplitude, while the frequency remains constant.

Fig. 8 shows a novel method of driving a cylinder and simultaneously generating a carrier current and a minimum signal.

Fig. 9 illustrates another method of generating a minimum signal.

Fig. 10 is a diagrammatic view of an arrangement of inductance coils for detecting signals.

Fig. 11 is another view of the shielding.

Figure 1:
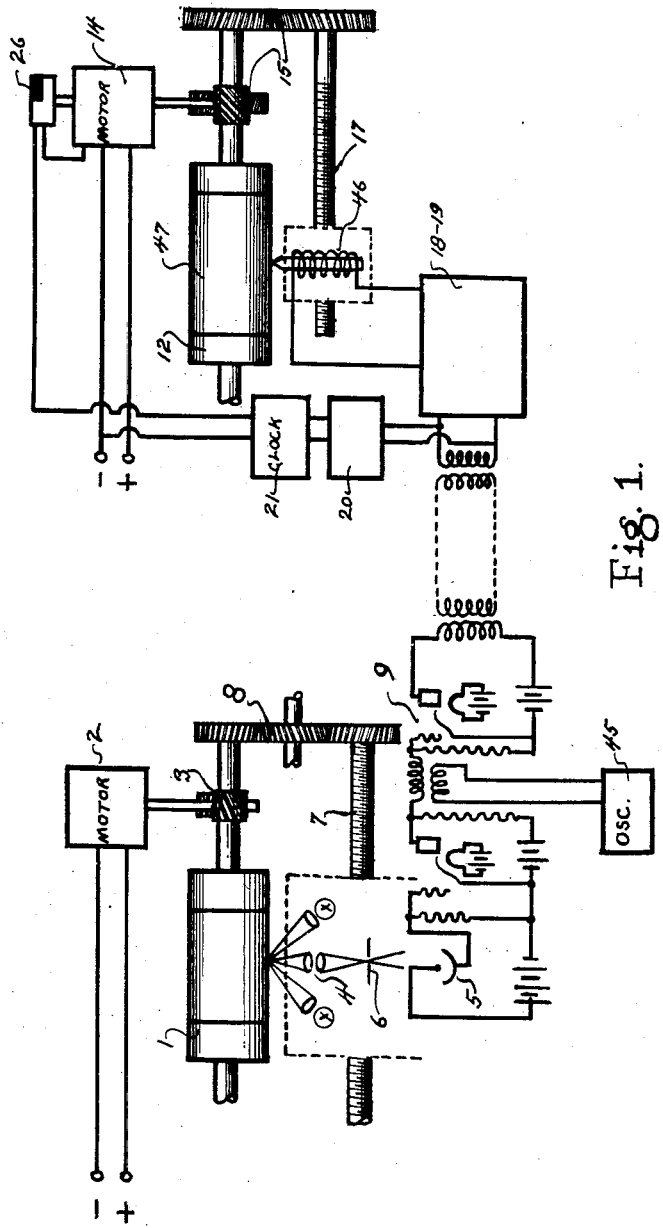
Fig. 1 shows a method for transmitting a picture and receiving an engraving.

In Fig. 1, the picture or pattern is mounted on a cylinder 1 and scanned by a photoelectric cell 5 and its associated optical system 4. The variations in current thus produced by the photoelectric cell are suitably amplified and caused to modulate an audio frequency carrier current. The carrier current may be generated by any of several well known methods, such as a commutator, tuning fork, A. C. light source, inductor alternator or light chopper, or by a specially prepared picture consisting of parallel lines of varying width, or by placing over the picture to be sent, a transparent film covered with closely spaced opaque lines. However I prefer to use a separate source of light and a tone wheel. The carrier current may be modulated by any of several equally well known methods, such as varying the grid bias of a vacuum tube or by merely allowing the picture to modulate the light by reflection or by transmission through a negative.

The modulated carrier current may then be used to modulate a vacuum tube transmitter, or sent over a telephone line to the receiver.

At the receiving end the signal may be amplified by any suitable means. The current is then caused to operate a magnetic engraving device 46 and engrave in a thin metal sheet 47 secured on a drum 12 similar to the transmitting drum 1. The point of the engraving tool is V-shaped so that it will engrave areas of printing surface in the metal sheet which will be functions of the depths of the grooves as dictated by the lights and shades of the subject scanned as indicated in U. S. Patent No. 1,719,621.

The two machines may be synchronized by any convenient method. The method we prefer to use and which we herein claim as our invention, depends on the use of a minimum volume of transmitted carrier current.

Figure 3:
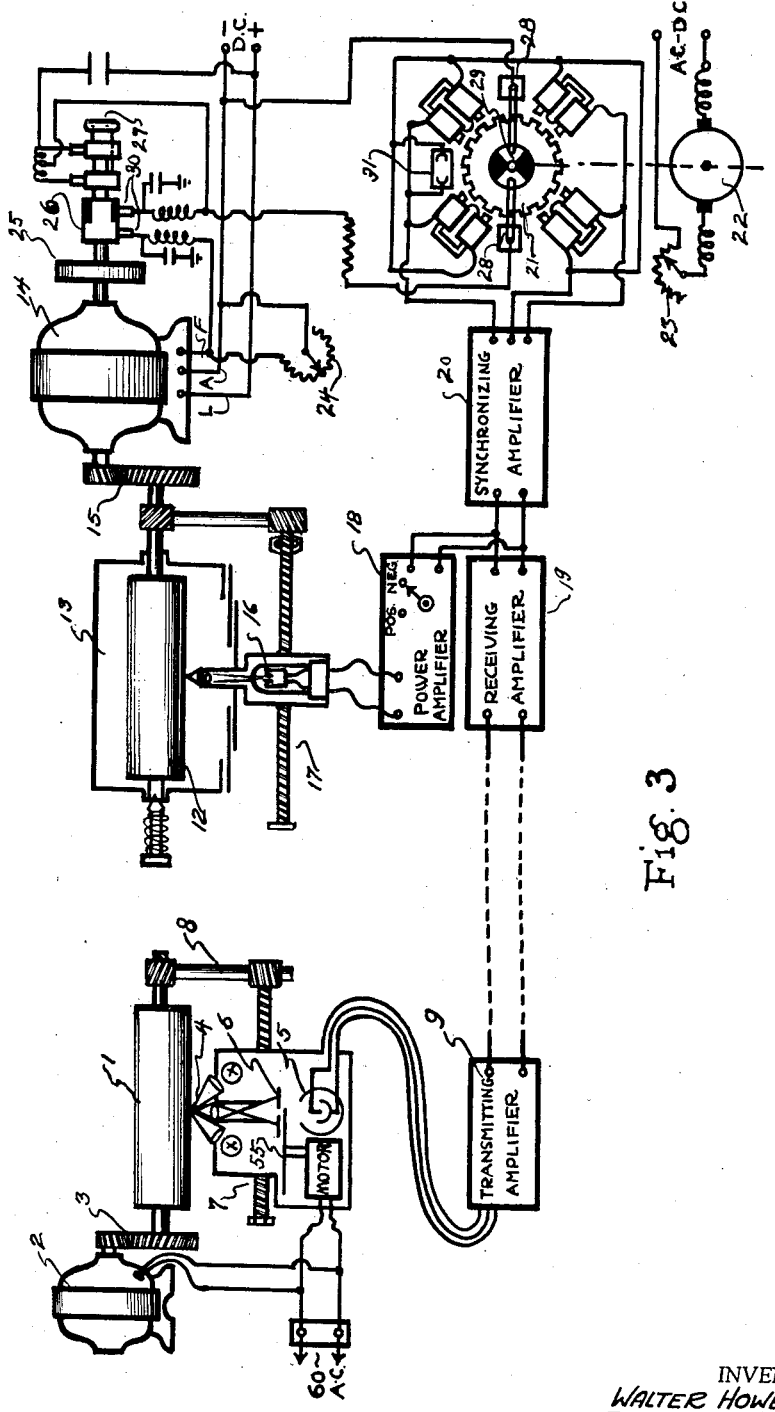
Fig. 3 illustrates an articulated system of facsimile transmission and reception, with photographic recording.

To illustrate our process of synchronization, Fig. 3 shows a cylinder 1 adapted to hold a picture of a sheet of written matter to be transmitted. The cylinder may be driven by any suitable motor, but in this instance a synchronous motor 2 is shown connected to the cylinder by means of gears 3. An optical system 4 is adjusted to cause unit areas of the picture to be reflected through a small aperture to a phototube 5.

Another synchronous motor 11 is arranged to turn a light chopping disk 55 at such a speed that an audible note will be produced by the amplified output of the phototube. The frequency of this amplified phototube output which hereinafter will be referred to as the carrier signal, will be proportional to the number of slots or holes in the periphery of the disk and to the speed of the disk's rotation.

The assembly of the optical system, aperture, phototube, motor and tone disk is mounted so as to be moved lengthwise of the cylinder by a leadscrew 7, driven by the gears 8. The output of the phototube may be amplified by any suitable means 9 and introduced into a line or radio transmitter by any suitable means.

Since the amount of light reaching the phototube at any instant will be proportional to the tone density of the subject being scanned at that instant, the carrier signal may be said to be modulated in amplitude. The form of the amplified signal is graphically shown in Fig. 7.

In the receiver, a cylinder 12 adapted to hold a photographic negative or positive, is rotated by a motor 14 inside a light-tight housing 13. Amplifiers 18 and 19 amplify the received signal and energize a crater lamp 16 or other suitable light recording means, carried lengthwise of the cylinder by the leadscrew 17. In the receiver, the light recording on photographic paper or film, may be replaced by the engraving device of Fig. 1 and the cylinder for holding a metal sheet. The received picture will be then engraved directly in the metal for printing purposes.

A portion of the received signal is amplified by a power amplifier 20 which is connected to the energizing coils of a synchronous motor 21 preferably of the impulse type. This synchronous motor is adapted to run on alternating current of relatively high frequency, for example 1800 cycles per second. The armature or rotor consists of an iron disk having equally spaced teeth like a gear and mounted so as to turn freely. The stator consists of one or more sets of electromagnets, arranged around the periphery of the disk in such a manner that the pole tips of the magnets coincide with the teeth of the rotor and so that the airgap separating the rotor and the stator is small.

Now, if the rotor is started artificially at the correct speed and an alternating current of any frequency is fed into the coils of the electromagnets, it will be found that at one speed, which is proportional to the frequency of the current and the number of teeth in the rotor, the rotor will continue to turn without artificial aid. This is a well known phenomena and is used almost universally in electric clocks. Since this motor is essentially a clock, it will be referred to hereinafter as the synchronizing clock.

In order to facilitate starting the clock and to prevent loss of synchronism should a momentary lapse of signal occur, such as might be caused by an operator coming in on the line, a small motor 22 is connected to the shaft of the clock. By means of the rheostat 23 the rotor of the clock may be brought to synchronous speed, where it will be maintained indefinitely by the carrier signal, or by the motor during such period as the carrier signal may be interrupted.

A commutator or contactor 28 on the shaft of the clock may be used in conjunction with any of several well known means for effecting synchronism of the receiver motor or the clock itself may be made to drive the receiving drum.

One system illustrated in Fig. 3 consists of a commutator 28 mounted on the shaft of a direct current shunt or compound wound motor 14. The commutator is for the purpose of producing a circuit between the brushes 30 at intervals of one or more during a revolution of the motor. The commutator is placed in series with the field of the motor and the contacts 28—29 on the clock, so that when the motor and the clock are running in phase, the resistance of the shunt field will be lowered. Thus more current will flow in the shunt field and decrease the speed of the motor.

A rheostat 24 may be used to adjust the speed of the motor 14 to that somewhat higher than the synchronous speed. It will then be seen that since the clock is driven at synchronous speed or multiple thereof by the carrier signal, the amount of regulating current through the shunt field of the direct current motor will be proportional to the difference in phase angle of the two motors and the direct current motor will tend to run at such a speed as to decrease the phase angle.

A flywheel 25 on the shaft of the motor 14 will smooth out the pulsations of regulating current and cause the motor to run with a minimum of phase shift.

In order to facilitate detecting synchronism, a gaseous discharge lamp 27 whose light will pulsate on and off at the make and break frequency of the contacts on the clock, may be mounted on the end of the shaft of the motor 14. When the motor is running at synchronous speed, the lamp will appear to be standing still, since at that speed it will light in but one position of the armature. If the motor runs slower than synchronous speed the lamp will appear to be turning in reverse direction to that of the motor and vice versa.

The synchronous clock 21 is of special construction to insure constancy of operation with as little hunting as possible. The commutator 28 in conjunction with brushes 29 form one means for providing a make and break contact at constant frequency. In contrast with a tuning fork, it is possible to change the period of the make and break frequency without stopping the clock, since the clock will follow faithfully any variation in frequency of the carrier signal. Another advantage is that the clock is not dependent on temperature for constancy of speed as is the frequency of the fork.

The synchronizing system which we herein disclose and claim is an improvement over the system described by Amstutz in his Patent No. 1,019,403, in that it allows the use of a carrier current of relatively high frequency which can be transmitted over an ordinary telephone line, and which may be modulated in amplitude or duration to form the image of the picture being transmitted. Amstutz uses the synchronizing frequency of lower periodicity, corresponding to our higher periodicity carrier synchronizing frequency, to transmit the image. He uses the same impulses for synchronization and image transmission by simply varying the duration of the impulses corresponding to the variations in light and shade of the subject. We prefer to use a high frequency carrier signal for synchronization only because of the attenuation of telephone lines to lower frequencies and we modulate this carrier frequency to carry the image.

A distinctive improvement of our system over that of Amstutz is that we provide for generation of a sinusoidal carrier signal, which is adapted to be transmitted over telephone lines with the least attenuation. Amstutz generates a signal of unidirectional pulsations of varying duration, as dictated by a selenium cell. These pulsations would be adaptable for telegraph transmission but would not be allowed on the telephone lines.

One phenomenon attendant to the transmission and reception of photoelectric engravings, is the tendency of the engraving tool to cause the receiving cylinder to slow down when the tool cuts deep into the metal. This is actually loss of synchronism, momentarily. Unless corrected, this loss of synchronism causes the engraved plate to look ragged where the lines should be straight. If the speed of the cylinder rotation is reduced for a noticeable time, distortion due to circuit lag will be apparent. In this case, the amount of distortion will be in proportion to the amount of speed reduction.

Various means may be used to correct this affect. The use of a heavy flywheel on the shaft of the driving motor of the receiver is the simplest. Should this be insufficient, other flywheels may be geared to the cylinder or torque amplifiers may be used to prevent slowing down.

One method which we have devised for correction for momentary loss of synchronism is graphically illustrated in Fig. 2. This method consists in driving two cylinders at the transmitting end and two at the receiving end. One of the cylinders at the transmitting end is the copy drum 1 which holds the picture to be sent. The other cylinder 48 is to receive an engraving directly from the transmitted copy. The two cylinders are either mounted on the same shaft or geared together, so that they are always in phase.

The variations in photoelectric current are amplified by an amplifier to cause the magnetic engraving tool 49 to reproduce the picture on the plate 50. The speed of the cylinders 1 and 48 may be held substantially constant by a flywheel 51 on the motor 2 or by a flywheel 52 geared to the cylinders of both.

However, it will be found that the cutting of the engraving tool into the metal will cause small variations in the speed of the cylinders. This difference in speed will not effect the accuracy or quality of the engraving, since both cylinders will move together.

At the same time that the picture is being engraved on the metal sheet on the cylinder of the transmitter, the same photoelectric current is used to modulate a carrier current of the proper frequency for transmission over a telephone wire. Any suitable method of modulation may be resorted to as long as a certain minimum volume of signal strength is transmitted. For introducing the synchronizing signal (the carrier) and the picture signal into a telephone wire we may use the method shown in Fig. 5, where the modulated synchronizing signal is amplified to a strength sufficient to operate a loud speaker of the conventional type found in radio use. A telephone transmitter placed near the speaker will pick up the audible note and transmit it in its true relationship to the picture which modulates it. The signal may also be introduced to the line by induction.

At the receiving end, the incoming signal may be taken from the telephone line in a number of ways. The method we prefer to use does not affect the electrical characteristics of the telephone in any way. It consists of two high impedance inductance coils connected in such a manner that undesirable stray signals will be cancelled by phase reversal and the desired signals allowed to pass to an amplifier. The inductance coils may be placed adjacent to the terminal box commonly used for telephone connections and will have induced in them the picture signal.

One of the features of our invention is that it meets the rigid specification of the telephone companies, in that it does away with direct wire connections to the lines and with otherwise disturbing elements such as direct current and overloading the system.

The method outlined above is illustrated by Fig. 10, where 57 represents a source of electromagnetic vibrations, constituting a field of force, changing in amplitude and frequency with the signal, such as an open core transformer, or an air or iron core inductance coil, through which pass the signal currents. 58 and 59 represent inductance coils connected in parallel and having one common connection to the center conductor of a concentric cable, and the other common connection to the outer or grounded conductor 61 of said concentric cable.

While only two coils are shown connected in parallel, it is obvious that any number of coils may be thus connected for cancelling out the effects of stray fields from more than one direction, without departing from the spirit of the invention.

In order to prevent inductive and capacitive feedback and to shield the coils themselves from stray fields, metallic shields 64—64 are provided to cover the edges of the coils 58 and 59. In order to further shield the coils, shields 60—60 are provided to shield the ends of the coils, shield 60—60 and 64—64 being electrically and mechanically grounded to the outer conductor of the concentric cable. The arrangement of the shields is more clearly shown in Fig. 11.

The shielding described here is only partial and is designed to be directional in its effect. Complete shielding would not be practical, since in that case the signal as well as the undesirable noise would be eliminated. Our invention provides for shielding which is not a closed circuit and so does not effect the frequency characteristic of the signal received or of the recording circuit.

The shielding as it is used in this instance is different in its effect and use from the shielding used in electrostatically and magnetically shielded transformers. This is partly due to the fact that the coils are not coupled inductively with each other, and therefore have no effect one upon the other as do the primary and secondary coils of a transformer. Moreover, the arrangement is such that undesirable signals are cancelled by phase reversal not dependent on mutual inductance between the coils.

The amplified received signal may be carried to a magnetic engraving tool 46, identical to the engraving tool used on the transmitter. The cylinders are held in synchronism by the process described above in which the minimum signal is the controlling factor. Any lag caused by deep cutting in the transmitting engraver thus compensates the corresponding lag in the receiver.

The rotation of the cylinders will be made still more steady by a flywheel geared to the cylinders IA and 48A or the flywheel 51A on the shaft of the motor 14 or both or any similar system employing the effect of inertia for stabilizing the rotation of the cylinders, such as a motor having a heavy rotor or employing a motor having a rate of rotational speed.

However, as it was pointed out in connection with the transmitting machine, the small variations in speed caused by the cutting tool in the metal will be still present. But, since these variations in speed due to the cutting tool are synchronous to the same variations in the speed of the transmitter drum, the net result will be that the effect is cancelled out and the distortion fails to appear, or is minimized to a negligible degree.

If it is desired to record a picture simultaneously with the engraving of the same received picture, it may be done by placing a sheet of photographic paper or film on the cylinder 48A and recording the picture by a beam of light focused on the light sensitive emulsion by the optical system 53 and the light source 16. The light may be modulated by the shutter 54 operated magnetically from the output of the amplifier 18 or by a glow discharge lamp as shown in Fig. 3.

In the recording system shown in Fig. 3, a light-tight housing 13 is adapted to support a rotatable cylinder 13. The housing is adapted to allow an optical recording system 16 to move lengthwise of the recording cylinder without allowing any light to reach the photographic film or paper, except that from the recording lamp. This is accomplished by a series of slides which fit over one another and telescope, as illustrated graphically in Fig. 3. When the picture has been recorded, the assembly of the outer housing and the inner cylinder may be taken into a dark room for development of the recorded picture.

Since the amount of light passing through the recording lamp determines the density or brightness of the light emitted therefrom, it will be readily seen that since the volume of tone transmitted depends on the amount of light reaching the phototube and the volume of light emitted by the recording lamp is proportional to the amount of transmitted tone, a picture recorded on a photographic negative will be dense when the white parts of the picture are being scanned and transparent or light when the black parts of a picture are scanned. When the negative is printed on positive paper, the image will be reversed to look like the transmitted picture.

The light from the recording lamp is passed through an optical slit which limits the width of the light sensitive emulsion to be darkened to approximately the width of the line advance in scanning and engraving. The unrectified alternating current pulsations recur with such rapidity that they overlap when recorded photographically in a continuous spiral, the intensity of which is modulated by the light and shade amplitudes of the transmitted picture to reconstruct the received picture without distortion. For receiving a positive, a negative print may be scanned. For engraving a positive from a transmitted positive, the modulated carrier signal may be rectified and the output voltage produce additional stages of power amplification. Some of the energy may be diverted to light the recording lamp, thus recording a positive print from a positive transmission.

It will be noticed here that we refer to the use of a recording lamp of the crater type, filled with one of the rare gases. However, it is obvious that the received signal may be used to operate a magnetic shutter for tuning on and off the light or any other suitable recording medium.

Fig. 5 illustrates a different method of generating a carrier signal and modulating said signal. It also illustrates a novel method of introducing a modulated audible signal into a telephone line.

In the drawings, 43 is an iron or steel rotor of an inductor alternator, the stator of which is represented by the magnets 42. The rotor has as many teeth as is necessary to produce the required frequency of carrier signal when it is rotated by the motor 2. The frequency of the voltage generated in the coils of the magnets 42 will be proportional to the number of teeth and the speed of the motor 2.

The scanning system consists of a conventional optical system 4 for scanning and an aperture 6 through which light reflected from a picture on the drum 1 passes to a photoelectric cell 5. The amplified output of the cell 5 is used to modulate the amplified carrier signal generated by the inductor generator 42—43 in any of the well known ways, such as grid modulation, plate modulation or screen grid modulation.

The output of the modulator 37 is then fed into a power amplifier 38 the output of which is used to energize a loudspeaker 39 of any convenient form. The lights and shades of the picture scanned will then be converted into sound variations, proportional in intensity to the density of the picture at any instant, and consequently, to the amount of light received by the phototube 5.

If now a telephone transmitter 40 is placed near the speaker 39, the audible variations will be picked up and transmitted in the same manner as speech or whistling. The conventional terminal telephone box is indicated by 41.

Gear mechanism 8 and lead screw 7 are provided to move the scanner from one end to the other of the cylinder.

In order to maintain the minimum signal required to override noise on the line and to provide for synchronism, a certain amount of the carrier signal is allowed to pass through the amplifying system without being modulated by the phototube output. Then, when there is no light reflected from the picture as in scanning black, that amount of synchronizing carrier signal will still be transmitted over the line. At the receiving end, the recording system or the engraving system may be adjusted so that the minimum signal will be the limit in either the shadow or high-light part of the picture and increase of the tone will add or subtract from the shading as the case may be.

Fig. 6 shows still another way by which a picture signal may be introduced into a telephone line. Here 9 indicates a power amplifier and 44 a coil of proper proportions and impedance to match the plate resistance of the output tube of the amplifier. The coil is placed near the terminal box 41 of the telephone system so that variations of signal enter the line, through the windings of the transformer in the box. For the coils any network promoting cross talk on the line may be substituted.

Fig. 7 graphically illustrates the appearance of an oscillogram of a portion of the modulated carrier current. It is to be noted that the frequency of the signal remains contant while the amplitude changes as dictated by the light and shade of the subject.

In Fig. 8 we show a novel way of driving the scanning cylinder of the transmitter in synchronism with the generation of the carrier signal. Here the driving motor 2 is mounted on the scanning carriage. On one end of the shaft of it is the light chopping disk 55, which breaks up the light entering through the optical system 4 before it reaches the phototube 5. On the other end of the shaft is connected a flexible cable such as is used for operating a dentist's drill. The other end of the cable is connected to the gear train 3 which drives the cylinder for scanning. The object of this arrangement is to prevent hunting for the light chopper with respect to the cylinder, as would happen should the motor drive the cylinder directly and the light chopper disk through the flexible cable.

In order to provide for generation of a minimum volume of signal, we divert a portion of the light from the exciter lamp through a suitable optical system through the light chopper to the phototube, as shown in Fig. 8.

The arrangement of Fig. 8 causes all synchronous movements of transmitter and receiver to be locked with the transmitting motor. Should this motor hunt or change speed within limits all other movements, such as speed of scanning and receiving drums, line advance of transmitter and receiver and duration of amplitude in scanning and recording the picture will swing in harmony with it.

Reception of a picture simultaneously with the engraving provides for enlarging the engraving or reducing the engraving should such be desired for later use, a common practice in newspaper work. Should the received engraving be distorted by interruptions on the line it might be difficult or impossible to repair the distortion. It is not difficult by retouching to repair the photograph and re-engrave the same.

H. G. Bartholomew, in his U. S. Patent No. 1,454,719, describes a system of facsimile transmission, in which an audible signal is generated by a make and break circuit provided for by a specially prepared plate for transmission. This consists of a line or dot half-tone picture printed on metal with an insulating resist, which when developed, makes portions of the sheet bare and the other portions covered by the resist. A metal stylus which is caused to traverse the plate by scanning, causes pulsations of current when the metal plate is one side of an electrical circuit and the needle the other side. The frequency of the audible note is proportional to the speed of the scanning and the modulation is due to the difference in duration of the individual impulses.

Generation of a carrier signal photoeletrically has no practical frequency limits and has the added advantage that it makes possible generation of sinusoidal signals, which are more adapted to telephone transmission.

The basic difference between our system and that proposed heretofore is that previous expedients have caused the picture elements to be changed into sound vibrations. We generate the sound separately from the picture elements and only use it as a carrier and as a synchronizing agents. The picture itself in our system has no sound characteristics whatever. Its variations of light and shade only modulate the amplitude of the sound carrier waves.

While cylindrical scanning and engraving are shown in the illustration, they form no part of this invention, as planetary or flat-bed scanning and engraving may be substituted therefor. Other alternatives of structure may be used to meet the demands of practice without departing from the spirit of the invention.

Another method of providing for a minimum signal is shown in Fig. 9. Here light from an auxiliary light source is directed through the light chopper to the phototube. It is important in all cases of the generation of a minimum signal by the use of light not coming from the picture, that the phase of the light coming from the picture and the light from the auxiliary source, whether diverted from the scanning light or generated separately, be the same, i. e., the two lights should strike the cell at the same instant, for any deviation from this condition will cause distortion of the signal and result in a poor picture being received.

Transmission of a continuous tone picture and a half tone engraving provides for engraving a three dimensional half tone from a two dimensional photograph, the V-shaped tool engraving parallel lines of variable width and depth as dictated by the light and shade of the subject scanned as outlined in the patents to Howey above cited. It also provides for re-engraving the parallel line half tone at angles suitable to avoid moires from the received picture after the manner described in U. S. Patent No. 1,849,544. The use of color filters to separate a colored picture for transmission and engraving two or more color separation process printing plates at angles suitable to avoid moires as indicated in the above cited patent are also made possible by remote control in accordance with this process.

The method of receiving picture signals from the telephone network without direct physical connection to the network is desired to protect the delicately balanced network from injury by grounding or introducing direct current to the line or overloading the line. Our system of transmission and reception permits no modulated carrier signals to exceed maximum allowable signal level.

The method of transmitting signals to the line, other than by sound to the transmitter, has the same distinct advantage of avoiding direct physical connection to the telephone network. The arrangement of Fig. 10, substituting two coils for the one coil of Fig. 6, may be used for transmission as well as reception. The coils may be cored in any suitable manner. For transmission our input terminals are adjacent but insulated from any part of the transmission system to promote cross talk. Such arrangements involve capacitance as well as inductance. Output leads sufficiently adjacent but insulated from the transmission network to set up energy transfer may be used for introducing the signal to the network, after the manner of cross talk. It is proper to refer to our method of transferring signals to or from the telephone network as involving capacitance as well as inductance. It may not only utilize inductance but it may utilize capacitance. It may utilize capacitance to introduce the signal and inductance and capacitance to receive the signal. It may utilize inductance and capacitance to transmit the signal and to receive the signal.

Our method of using a synchronous clock mounted on a single shaft with and controlling the speed of a driving motor may be varied to secure the same effect with gears or other form of direct drive. The synchronizing signal may be transmitted from the same point as the picture signal or from other points remote from both the transmitter and the receiver to synchronize both the transmitter and the receiver. Synchronizing signals of constant frequency, locally generated at transmitting and receiving stations, may be used to drive the synchronous clocks.

What we claim is:

1. A system for telephoning pictures which comprises modulating an audio frequency current with picture amplitudes, limiting the levels of the audio frequency current to a predetermined minimum representing an extreme tone in the picture to override line noise, and graded by other tones in the picture to a maximum level representing the other extreme tone, predetermining the maximum level to preserve the balance of a telephone network, predetermining the frequency of the audio frequency current to the allowable frequency of a common telephone system, introducing the modulated audio frequency picture signals thus produced to a telephone network by capacitance and inductance having no direct connection to the telephone network, and transferring the received signals from the telephone network by capacitance and inductance.

2. A system for telephoning pictures which comprises, propagating constant frequency signals having a predetermined audio frequency no higher than the upper frequency limit of a low fidelity telephone system, photoelectrically scanning a picture and modulating the audio frequency carrier current with amplitudes of a predetermined minimum level to override line noise representing the black portions of the picture and with amplitudes of varied levels representing lighter portions of the picture graded to a predetermined maximum level such as will not upset the balance of the telephone network, introducing the signals to the telephone network, and receiving the signals from the telephone network.

3. A system for transmitting and receiving pictures which comprises, propagating audio frequency carrier signals having a fixed constant frequency within the low fidelity limitations common to an ordinary telephone system, modulating the signals with variable amplitudes to represent gradations in tone of the picture, predetermining the amplitude modulations representing the tonal gradations of the picture within the minimum level and the maximum level limitations to override line noise and maintain the balance of the telephone network, and transferring the signals to and from the telephone network without direct physical connection to such network.

4. A system for transmitting and receiving pictures which comprises, propagating signals to transmit amplitude modulations within predetermined minimum telephone levels to override line noise and predetermined maximum telephone levels to maintain the balance of the telephone network during the period of transmission, photoelectrically scanning a picture and generating a picture carrier signal having audio frequency of a fixed constant frequency within the low fidelity limitations common to an ordinary telephone system, photoelectrically modulating the picture carrier signal with amplitude modulations within prescribed and predetermined minimum and maximum telephone levels as dictated by the light and shade values of the picture being scanned, introducing the modulated signals to a telephone network by capacitance, receiving the signals from the telephone network without direct physical connection therewith, and amplifying and recording such signals.

5. A system for telephoning pictures which comprises, propagating constant frequency audio carrier current, photoelectrically scanning a picture and modulating the audio frequency current with amplitudes of predetermined minimum level representing darkest portions of the picture sufficient to override line noise and with amplitudes ranging from the minimum level to a predetermined maximum level representing lighter portions of the picture so that the maximum level representing the lightest portion of the picture will not upset the balance of a telephone network, introducing the signals to the telephone network by capacitance having no direct connection to the network, receiving the signals by inductance, and in amplifying and recording such signals.

6. In remote control systems for photographically recording pictures, means for scanning a subject, means for photoelectrically generating unitary audio frequency carrier signals at a predetermined minimum level, means for modulating said signals by the lights and shades of the subject being scanned, means for transferring said signals to a telephone network without physical connection therewith, a suitable receiver physically disconnected from the telephone network adapted to receive the modulated signals, means for amplifying the signals, and means for photographically recording a picture by the variations of the amplified signals.

7. In picture telephony, a telephone line connected to sending and receiving devices adapted to convey audible speech, a picture sending machine and a picture receiving machine extraneous of the telephone line, means for producing electrical impulses at approximately 1800 cycles per second, means for inductively introducing such signals onto the telephone line and receiving them from off the telephone line, a picture to be transmitted comprising variable tones, means for modifying the characteristic of each cycle in accordance with the corresponding pictorial characteristics of the picture that is being transmitted, means for amplifying the modified impulses, and means for recording such impulses.

8. In picture telephony, a telephone line having sending and receiving stations connected therewith adaptable for voice transmission, a picture transmitting device physically disconnected from the telephone line at one station, a picture receiving device physically disconnected from the telephone line at another station, means for inductively subjecting both picture machines and the telephone line to a carrier current of uniform periodicity below the threshold of interference with telephonic conversations on the line, means for modifying the individual characteristics of each carrier impulse in accordance with the variations of light and shade of an image on the picture transmitting machine, and in recording such modified carrier impulses whereby the same carrier waves will simultaneously maintain the phase of the receiving and sending picture machines and by reason of a modulation of the carrier impulse transmit an image over the telephone line without any physical connections therewith.

9. In picture telephony, a telephone line connected to sending and receiving devices adapted to convey audible speech, a picture sending machine and a picture receiving machine extraneous of the telephone line, means for producing electrical impulses at approximately 1800 cycles per second, means for inductively introducing such signals onto the telephone line and receiving them from off the telephone line, a picture to be transmitted comprising variable tones, means for modifying the characteristic of each cycle in accordance with the corresponding pictorial characteristics of the picture that is being transmitted, means for amplifying the modified impulses, and means for recording such impulses.

10. In picture telephony, a telephone line having sending and receiving stations connected therewith adaptable for voice transmission, a picture transmitting device physically disconnected from the telephone line at one station, a picture receiving device physically disconnected from the telephone line at another station, means for inductively subjecting both picture machines and the telephone line to a carrier current of uniform periodicity below the threshold of interference with telephonic conversations on the line, means for modifying the individual characteristics of each carrier impulses in accordance with the variations of light and shade of an image on the picture transmitting machine, and in recording such modified carrier impulses whereby the same carrier waves will simultaneously maintain the phase of the receiving and sending picture machines and by reason of a modulation of the carrier impulse transmit an image over the telephone line without any physical connections therewith.

WALTER HOWEY.
BENJAMIN WOODWARD.
JOHN R. HANCOCK.